J. KUNDIS.
HORSESHOE.
APPLICATION FILED APR. 16, 1914.
1,107,620.
Patented Aug. 18, 1914.
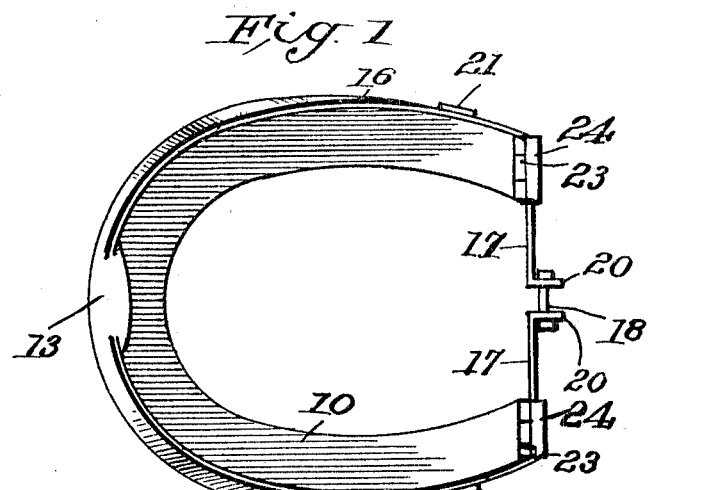
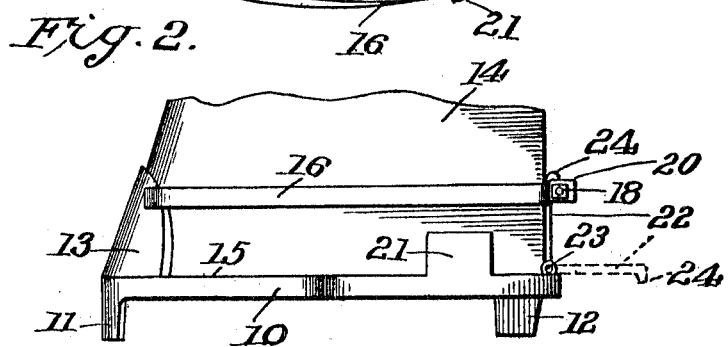
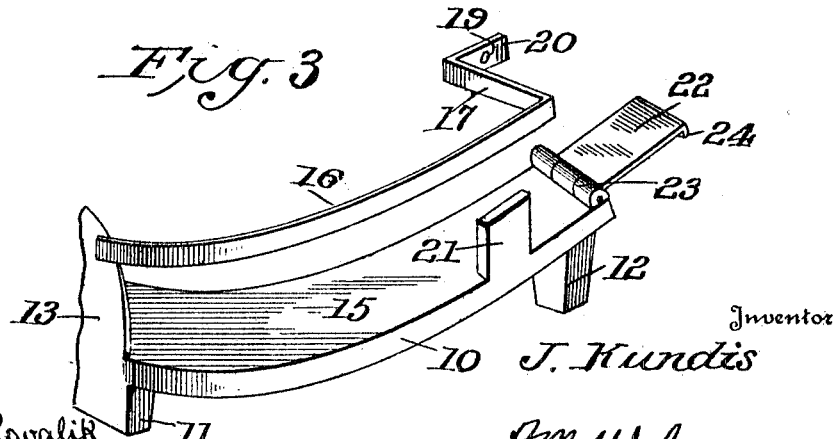

UNITED STATES PATENT OFFICE.

JOSEPH KUNDIS, OF YOUNGSTOWN, OHIO.

HORSESHOE.

1,107,620.  Specification of Letters Patent.  Patented Aug. 18, 1914.

Application filed April 16, 1914. Serial No. 832,336.

*To all whom it may concern:*

Be it known that I, JOSEPH KUNDIS, a subject of the Emperor of Austria-Hungary, residing at Youngstown, in the county of Mahoning and State of Ohio, have invented certain new and useful Improvements in Horseshoes, of which the following is a specification.

This invention relates to certain new and useful improvements in horseshoes.

The primary object of this invention is to provide a horseshoe readily attached to the hoof of the horse without the employment of nails or similar hold-fast devices but providing a structure that is readily slipped on and off of the hoof although having a firm locking means for employment when the shoe is in use.

A further object of the device is to provide a horseshoe provided with a resilient securing band and a pivoted locking plate, and whereby the shoe may be readily applied and removed as well as adjusted by the manipulation of a single bolt.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and wherein like designating numerals refer to corresponding parts throughout the different views:—Figure 1 is a top plan view of the shoe. Fig. 2 is a side elevation of a shoe mounted upon a portion of a hoof, and, Fig. 3 is a perspective view of substantially one-half of the shoe illustrated as detached from the hoof.

Referring more in detail to the drawings, the horseshoe 10 of substantially the usual form is provided having the toe-calk 11 and two heel calks 12 upon its lower surface while an inwardly-inclined toe-plate 13 being arcuate in cross-section is mounted upon the toe portion of the shoe.

The horse's hoof, a portion of which is illustrated at 14 in Fig. 2 of the drawings, is adapted to be seated upon the upper surface 15 of the shoe which surface substantially conforms to the configuration thereof, the hoof being positioned with its forward portion fitting against the inner face of the front plate 13. Resilient metallic straps 16 are secured to the front plate 13 and extend in opposite directions therefrom around the hoof and are provided with integral angular arms 17 adapted to fit against the rear of the hoof and to be removably secured in position by the locking bolt 18 positioned through opposite alining perforations 19 of the terminal rearwardly-extending parallel lugs 20 carried upon the inner adjacent extremities of the arms 17.

Upwardly projecting side plates 21 are mounted upon opposite sides of the shoe 10 and adjacent the outer edges thereof for bearing against the opposite sides of the hoof for preventing any side movement of the hoof upon the shoe while a hinged rear plate 22 is mounted upon the upper face of the shoe at the rear extremity of each heel portion thereof, and is connected by a hinge 23 to the carrying heel portion. The said plates 22 are each provided at their top with a marginal projecting flange 24 adapted to fit beneath the rear arms 17 of the straps 16 when said rear plates are vertically placed in their closed positions, and by which engagement, the plates are locked flatly against the hoof by means of the said locking bolt 18.

The complete operation of the device, it will be noted, consists in applying the shoe by means of seating the hoof thereupon with the straps 16 sprung therearound and with the strap arms closed upon the end plates and all of which are locked in position by means of the bolt 18 while the shoe is readily removed by either loosening or removing the said bolt from its engaging lugs 20.

While the forms of the invention herein shown and described are what are believed to be preferred embodiments thereof, it is nevertheless to be understood that various forms and modifications may be resorted to which will fall within the spirit and scope of the invention as claimed.

What I claim as new is:—

1. In combination with a horseshoe, a forwardly-positioned inclined plate and upwardly projecting marginal side plates mounted thereon and adapted for the reception of a horse's hoof therebetween and upon the shoe, end plates hinged to the rear ends of the heel portions of the shoe and being of substantially the same width as the shoe, projecting marginal angular flanges upon the tops of said end plates, resilient straps secured to and oppositely projecting from said front plate and adapted for surrounding the hoof when positioned upon the shoe, angular rear arms upon said straps adapted for engagement beneath said rear plate flanges when said rear plates are in closed position upon the hoof, pierced rearwardly-projecting lugs at the adjacent inner ends of said rear arms, and a locking bolt removably positioned through the perforations of said lugs.

2. A device of the class described, comprising a calked shoe, an inwardly-inclined front plate arcuate in cross-section mounted upon the hoof-engaging face of said shoe, marginal projecting angularly-positioned side plates mounted upon said hoof-engaging shoe face, plates of substantially the same width as said shoe and hinged to the upper rear edge of the heel portions of the shoe, outwardly-projecting marginal flanges upon the upper edges of said rear plates, resilient oppositely-extending straps secured to said front plate and adapted for encircling a hoof positioned upon said shoe and extending beneath said rear plate flanges, and a locking bolt adjustably secured between the projecting rear ends of said straps.

In testimony whereof I affix my signature in presence of two witnesses.

JOSEPH KUNDIS.

Witnesses:
MIKE SUSUK,
MICHAEL FIALLA.

Copies of this patent may be obtained for five cents each, by addressing the "Commissioner of Patents, Washington, D. C."